United States Patent [19]

Schönfeld et al.

[11] Patent Number: 5,607,010
[45] Date of Patent: Mar. 4, 1997

[54] PROCESS FOR COOLING DIESEL ENGINE EXHAUST GASES

[75] Inventors: Dieter Schönfeld, Markdorf; Ralph-Michael Schmidt, Lanenargen, both of Germany

[73] Assignee: MTU Motoren- Und Turbinen-Union Friedrichshafen GmbH, Friedrichshafen, Germany

[21] Appl. No.: 423,986

[22] Filed: Apr. 18, 1995

[30] Foreign Application Priority Data

Apr. 26, 1994 [DE] Germany ............... 44 14 429.6

[51] Int. Cl.$^6$ ..................... F01P 5/00
[52] U.S. Cl. ............... 165/51; 165/905; 60/605.2
[58] Field of Search ............... 165/51, 52, 133, 165/905; 60/605.2

[56] References Cited

U.S. PATENT DOCUMENTS

| | | | |
|---|---|---|---|
| 3,968,649 | 7/1976 | Edwards . | |
| 4,106,449 | 8/1978 | Matsumoto et al. . | |
| 4,205,526 | 6/1980 | Owens . | |
| 4,330,084 | 5/1982 | Buchner et al. | 165/51 |
| 4,426,848 | 1/1984 | Stachowicz | 60/605.2 |
| 4,436,147 | 3/1984 | Hudson, Jr. . | |
| 4,574,878 | 3/1986 | Sugiyama et al. | 165/905 |
| 4,702,218 | 10/1987 | Yoshioka et al. | 60/605.2 |
| 5,203,311 | 4/1993 | Hitomi et al. | 60/605.2 |
| 5,205,265 | 4/1993 | Kashiyama et al. | 60/605.2 |
| 5,425,239 | 6/1995 | Gobert | 60/605.2 |
| 5,440,880 | 8/1995 | Ceynow et al. | 60/605.2 |

FOREIGN PATENT DOCUMENTS

| | | | |
|---|---|---|---|
| 0346803 | 12/1989 | European Pat. Off. . | |
| 4020357A1 | 1/1992 | Germany . | |
| 0037318 | 2/1991 | Japan | 60/605.2 |
| 5-071428 | 3/1993 | Japan | 60/605.2 |
| 5-187329 | 7/1993 | Japan | 60/605.2 |

Primary Examiner—Edward K. Look
Assistant Examiner—Mark Sgantzos
Attorney, Agent, or Firm—Evenson, McKeown, Edwards & Lenahan, P.L.L.C.

[57] ABSTRACT

A process and a suitable arrangement for cooling diesel engine exhaust gases in an exhaust gas recirculation system is provided. In order to be able to avoid a contamination of the heat exchanger as well as a resulting required regenerating of the latter in the case of a cooling of the hot exhaust gas flow over a large temperature range, the cooling of the hot exhaust gas flow is carried out in at least two steps in that the exhaust gas flow flows successively through two heat exchangers which are each adapted to the corresponding cooling temperature range. By adapting the heat exchangers to specific small temperature ranges, even hot exhaust gas flows of up to 800° C. can be cooled to a desired low temperature by the series connection of a corresponding number of different heat exchangers, without causing significant contaminations of the exhaust gas cooling arrangement by exhaust gas particles. By the use of known heat exchangers, the construction of the exhaust gas cooling system becomes particularly reasonable with respect to cost.

7 Claims, 1 Drawing Sheet

PROCESS FOR COOLING DIESEL ENGINE EXHAUST GASES

BACKGROUND AND SUMMARY OF THE INVENTION

The present invention relates to a process and apparatus for cooling diesel engine exhaust gases in an exhaust gas recirculation system of the type where the hot exhaust gas coming from engine cylinders is first cooled before it is admitted on the intake side with incoming fresh airflow.

An exhaust gas recirculation system which operates according to the above-mentioned process and has a cooling device is known, for example, from German Patent Document DE 40 20 357 A1. It is there suggested to arrange a heat exchanger or a mixing device in the flow direction behind the cleaning system in a suitable area of the exhaust gas pipe. By means of the provided dilution of the hot exhaust gases with cooling air, an effective cooling of the exhaust gases is achieved and thus the occurrence of overheating damages is prevented.

Because of the occurring high exhaust gas temperatures, the heat exchanger parts or driving devices, which come in contact with the hot exhaust gas flow for the cooling of the diesel engine exhaust gases, are made of high-temperature-stable steel types. Furthermore, during an exhaust gas cooling to temperatures below 250° C., a condensation occurs of acid exhaust gas constituents as well as deposits of exhaust gas constituents on the heat exchanger walls which lead to an impairment of the efficiency and finally to a clogging of the heat exchanger. A cleaning of the heat exchanger with respect to the particles deposited on the pipe walls and of such deposits, irrespective of the construction of the heat exchanger, can be carried out only at very high expenditures.

In particular, the acid constituents of the condensate result in corrosive damage to the heat exchanger.

In order to counteract these undesirable contaminations of the heat exchanger, it is known to manufacture the components of the heat exchanger which are in contact with the exhaust gas flow of corrosion-proof metals which are particularly corrosion-resistant with respect to the sulfurous acid which may, for example, be formed. This measure can prevent a contamination of heat exchangers through which an exhaust gas flows which has a temperature of from 500° to 700° C. However, when the exhaust gas temperature falls to temperatures below 250° C., an adhesion tendency of the exhaust gas particles takes place which is as strong as before.

In order to counteract the adhesion tendency in this temperature range of the exhaust gas flow, it is also known to coat the exhaust-gas-carrying pipes of the heat exchanger with a suitable plastic material, or to manufacture the pipes themselves, for example, of polytetrafluoroethylene (PTFE).

Although, by means of the known measures, a contamination of the heat exchanger in the intended temperature range of the exhaust gas flow can, in each case, be effectively prevented, there is the disadvantage that, in actual operational applications of diesel engines, the exhaust gas flow in the exhaust gas recirculation pipe will fluctuate within a temperature range which is so large, depending on the application conditions and the power output of the engine, that it is not covered by any of the known heat exchangers. As a result, in engine operating conditions with an exhaust gas temperature which is outside the application temperature range of the used heat exchanger, the contamination of and the damage to the heat exchanger will be just as high.

It is therefore an object of the present invention to provide a process and an arrangement suitable for implementing this process for the cooling of the exhaust gas which reliably prevent contaminations and damage and can be implemented at reasonable cost.

This object is achieved according to the present invention by providing an arrangement where the cooling of the hot exhaust air flow is carried out in at least two successive steps in respective serially arranged heat exchangers.

A principal advantage of the cooling of the hot exhaust gas flow according to the invention in at least two steps is the resulting division of the overall cooling temperature difference into individual temperature ranges. Since, in these individual ranges, the cooling temperature difference is in each case lower than in the case of the previously used exhaust gas cooling to the starting temperature, the invention provides the possibility of connecting in series several heat exchangers which are each specifically adapted to a defined temperature range in order to thus prevent the formation of contaminations and/or corrosion damages in the heat exchangers.

Because of the flow direction of the exhaust gas flow, the temperature levels of the individual cooling temperature ranges decrease in the flow direction so that the exhaust gas flow is finally cooled to a temperature below 250° C. before it is entered into the last cooling step. In the case of the corresponding selection of the individual temperature ranges, expediently two or several conventional heat exchangers can be connected in series in the exhaust gas recirculation flow, which results in an extremely simple and therefor low-cost construction of the arrangement according to the invention.

From the large number of known heat exchangers, heat exchangers seem particularly suitable which, with respect to the material and/or coating, are each adapted to an application in a defined temperature range. Preferred materials of such heat exchangers are high-temperature stable steel types or titanium as well as parts made of these materials which are coated with suitable plastic materials.

Basically, a series connection of a plurality of heat exchangers is conceivable which each counteract individual contamination tendencies in the corresponding cooling temperature ranges, which are preferably small temperature ranges.

Other objects, advantages and novel features of the present invention will become apparent from the following detailed description of the invention when considered in conjunction with the accompanying drawings.

DETAILED DESCRIPTION OF THE DRAWINGS

Figure 1:
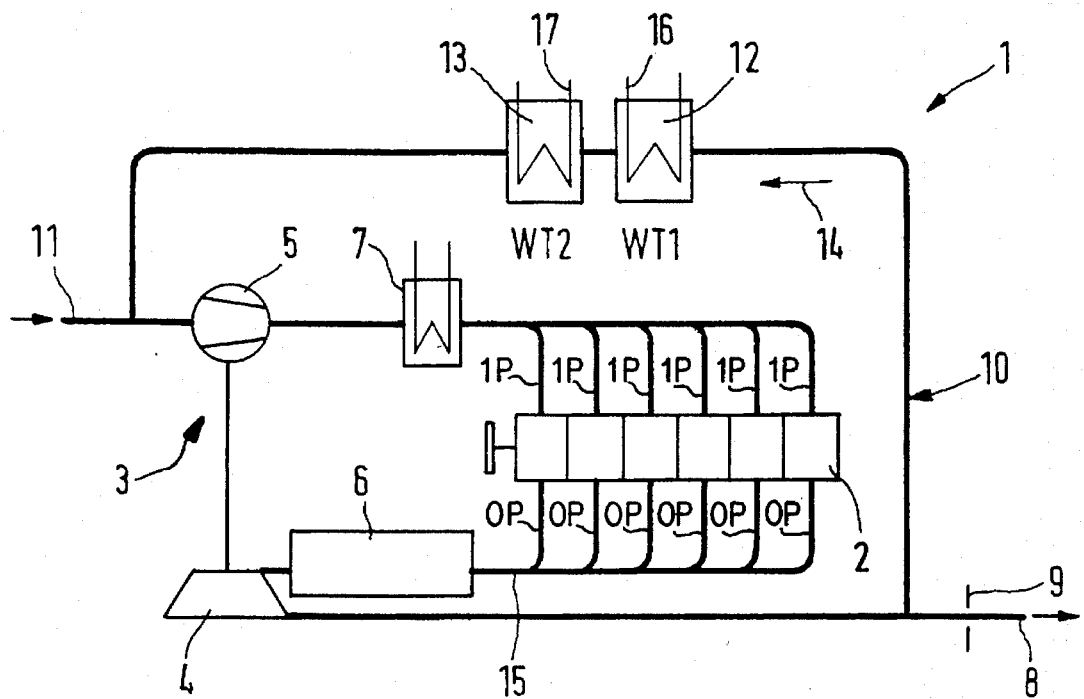
FIG. 1 is a schematic representation of the exhaust gas circulation system of a supercharged internal-combustion engine with an exhaust gas recirculation system, constructed according to a first preferred embodiment of the present invention.

FIG. 1 illustrates the exhaust gas circulation of a supercharged diesel engine 2. For supercharging the diesel engine 2, an exhaust gas turbocharger 3 is used whose compressor 5 is connected with the fresh air supply 11 and which is driven by an exhaust gas turbine 4. In the illustrated embodiment, the charge air compressed by means of the compressor 5 first flows through a charge air cooler 7 before it is distributed into the combustion spaces C of the diesel engine 2 by way of corresponding inlet pipes IP. The combustion exhaust gases of the diesel engine 2 from outlet pipes OP are combined in an exhaust gas plenum pipe 15 and guided through a soot filter 6.

The hot exhaust gas flow, which was cleaned with respect to the soot particles by the soot filters 6, drives the exhaust gas turbine 4 and leaves the exhaust gas circulation system through the exhaust pipe 8.

In the exhaust pipe 8, a throttle valve 9 is also provided and upstream of the throttle valve 9, a branch-off of the exhaust gas recirculation system 10. In this case, the amount of the exhaust gas recirculation flow is controlled by way of the position of the throttle 9. For example, in the case of operating conditions with low power exhaust gases, this throttle 9 is closed relatively far so that a large exhaust gas recirculation flow is admixed to the fresh air through the exhaust gas recirculation 10 and is again supplied to the diesel engine as charge air. In this embodiment, two heat exchangers 12, 13 are connected in the exhaust gas recirculation system 10, through which heat exchangers 12, 13 the hot exhaust gas flow flows successively in the flow direction 14.

The hot exhaust gases, which have a temperature of up to 700° C. and come from the exhaust gas turbine 4, first reach the heat exchanger 12 where they are cooled to a predetermined temperature of below 250° C. and the amount of heat delivered by the exhaust gas flow in the heat exchanger 12 is absorbed by its coolant circulation 16. The exhaust-gas-carrying pipes of the heat exchanger 1 consist of a high-temperature-stable corrosion-resistant steel in order to be able to withstand the extreme stress caused by the high exhaust gas temperatures.

From the heat exchanger 12, the exhaust gas flow, which is now cooled to a temperature of no more than 250° C., reaches the next heat exchanger 13 having a coolant circulation 17, in which the exhaust gas flow is cooled to the desired admixing temperature before it is mixed with the fresh air.

The heat exchanger 13 is adapted specifically to the use at exhaust gas temperatures below 250° C. It consists of PTFE (e.g. TEFLON) pipes or at least PTFE-coated pipes which particularly effectively prevent an adhesion of the particles in the exhaust gas flow. Basically, any materials with comparable characteristics may be used for this purpose.

Figure 2:
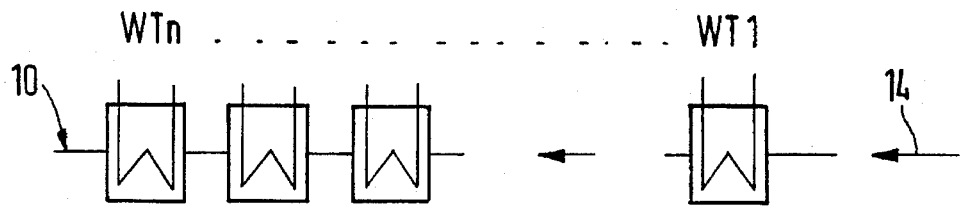
FIG. 2 is a schematic representation of an arrangement of several heat exchangers in the recirculated exhaust gas flow, constructed according to preferred embodiments of the present invention.

FIG. 2 shows an embodiment of the exhaust gas cooling system in which a larger plurality of heat exchangers are connected in series. The same exhaust gas flow flows through these heat exchangers. According to the invention, it is important in this case that each individual heat exchanger is used specifically for preventing a contamination occurring in a defined temperature range by a defined exhaust gas constituent of the exhaust gas flow. In order to prevent the contaminations, the individual heat exchangers may consist of materials which are suitable for this purpose or may have correspondingly suitable coatings.

As mentioned above, PTFE is particularly well suited as the coating material because, as known, it prevents an adhering of exhaust gas constituents. However, since PTFE permits a diffusion of the exhaust gas through the coating onto the basic heat exchanger material, it may be expedient in individual cooling temperature ranges according to preferred embodiments to manufacture the carrier material of corrosion-resistant materials. As mentioned above, pure titanium may be used for this purpose which has a very high corrosion resistance particularly with respect to the acid exhaust gas constituents which condense to sulfurous acids during the cooling of the diesel engine exhaust gases.

By means of the arrangement for the cooling of exhaust gas according to the invention, a cooling in stages is suggested of the recirculated exhaust gas flow which is divided into two or several temperature ranges and which prevents the previously occurring contamination of the heat exchangers used for the cooling in that individual heat exchangers with falling application temperature ranges are connected in series and are specifically adapted to the respective cooling temperature ranges. Since a large number of heat exchangers are known which each operate optimally in a certain temperature range, by means of the solution of the invention, as a result of the suitable selection of corresponding heat exchangers, a simple and low-cost exhaust gas cooling can be implemented in the exhaust gas recirculation system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Process for cooling diesel-engine exhaust gases in an exhaust gas recirculation system, a hot exhaust gas flow coming from engine cylinders first being cooled before being admixed on an intake side of an engine to an incoming fresh air flow, wherein cooling of the hot exhaust gas flow is carried out in at least two successive steps, the hot exhaust gas flow being cooled in each cooling step to a different predetermined temperature, and wherein the exhaust gas flow is cooled to a temperature of at least below 250° C. before being subjected to a last of said at least two successive cooling steps.

2. Arrangement for cooling diesel engine exhaust gases in an exhaust gas recirculation pipe, comprising:

at least two heat exchangers connected in series with respect to an exhaust gas flow through said exhaust gas recirculation pipe, each heat exchanger being adapted to a different predetermined application temperature range; and wherein at least a last of said at least two heat exchangers being adapted to an application in a temperature range below 250° C. with respect to at least one of materials and coatings on parts of the heat exchanger contacted by said exhaust gas flow.

3. Arrangement according to claim 2, wherein exhaust-gas carrying parts of at least one heat exchanger are formed of high-temperature-stable, corrosion-resistant materials.

4. Arrangement according to claim 3, wherein exhaust-gas-carrying pipes of the heat exchangers are formed of titanium.

5. Arrangement according to claim 2, wherein at least one heat exchanger is provided which has plastic-coated, exhaust-gas carrying parts.

6. Arrangement according to claim 5, wherein the exhaust-gas-carrying parts are coated with polytetrafluoroethylene (PTFE).

7. Arrangement according to claim 5, wherein exhaust-gas-carrying pipes are made of polytetrafluoroethylene (PTFE).

* * * * *